J. S. ROYS.
Hand Seed-Sower.

No. 219,769.　　　　　　Patented Sept. 16, 1879.

Attest:
Clarence Poole
R. F. Barnes.

Inventor:
James Sidney Roys
By Geo. W. Dyer
Atty.

UNITED STATES PATENT OFFICE.

JAMES S. ROYS, OF LYONS, NEW YORK.

IMPROVEMENT IN HAND SEED-SOWERS.

Specification forming part of Letters Patent No. 219,769, dated September 16, 1879; application filed April 2, 1879.

*To all whom it may concern:*

Be it known that I, JAMES SIDNEY ROYS, of Lyons, in the county of Wayne and State of New York, have invented a new and useful Improvement in Hand Seed-Sowers; and I do hereby declare that the following is a full and exact description of the same, reference being had to the accompanying drawings, and to the letters of reference marked thereon.

The object I have in view is to produce a hand-machine for sowing grass-seed which will be cheap and simple in construction, will be light to carry, can be used in a wind, and will be efficient in operation; and my invention therein consists in the combination, with the long seed hopper or trough, of the peculiar devices for dropping and scattering the seed, all as fully hereinafter explained.

Figure 1:
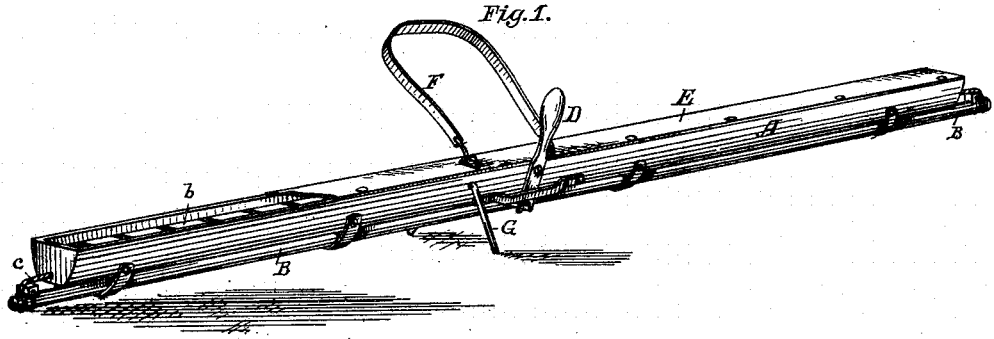
Figure 2:
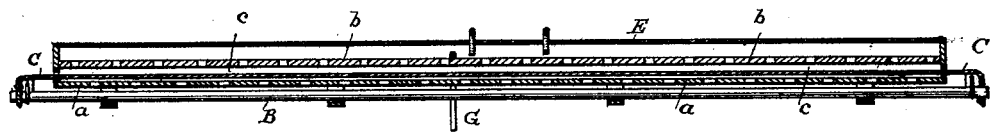
Figure 3:
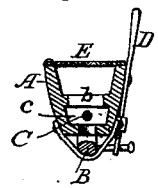

In the drawings, Figure 1 is a perspective view of the hand-sower, and Fig. 2 a vertical longitudinal section of the same. Fig. 3 is a transverse sectional view.

A represents a long trough-shaped hopper, of the usual exterior construction, being made of light and thin material to give it lightness. It has an open top, sloping sides, closed ends, and a perforated bottom $a$.

Above the perforated bottom $a$ of the hopper is a false bottom, $b$, having slots alternating with the perforations of the bottom $a$. Below the hopper is a rod, B, supported in loops of leather or hoop-iron secured to the sides of the hopper. This rod is somewhat longer than the hopper, and rests in its supporting-loops just below the perforations of the bottom $a$.

To the ends of the rod B is secured a cord, C, passing through the ends of the hopper, and through the chamber $c$, formed between the bottoms $a$ $b$.

Pivoted to one side of the hopper is a lever, D, connected at its lower end, by a pin and slot, with the rod B.

To protect the seed in the hopper from being blown out by the wind I provide a cover, E, which, for lightness, is made of cloth cut to fit the top of the hopper. The cloth is fastened permanently to the outer side of the hopper, and may be secured to the other side by hooks or loops, or by a light wooden rod.

The hopper is supported from the shoulders of the operator by a strap, F, having hooks on its ends engaging with loops or staples secured to the hopper.

The hopper is provided with two legs, G, formed of a single piece of heavy wire passed through the sides of the hopper and bent downwardly, to serve as legs to support the hopper in an upright position when being filled with seed.

When the device is in use for sowing seed, these legs can be turned up out of the way.

The operation of the device is apparent from the foregoing description, the seed being dropped through the perforated bottom of the hopper by the action of the cord.

By having the rod B situated just below the perforations of the bottom $a$ it serves to scatter the seed more evenly and completely than could be done without it.

The quantity of seed sown can be regulated by the stroke of the hand-lever and the step of the operator.

The principal advantages of my device, in addition to its efficiency in operation, are its lightness and cheapness and its simplicity of construction, which renders it less liable to get out of order.

What I claim as my invention is—

1. In a portable broadcast seed-sower, the combination, with the hopper having a perforated bottom, of a rod situated directly below the seed-openings, and adapted to be reciprocated by the hand of the operator, and a cord secured to the ends of the said rod, and working in the bottom of the hopper, substantially as described and shown.

2. The hopper A, having perforated bottom $a$ and slotted false bottom $b$, in combination with the rod B below the bottom $a$, the cord C, and the hand-lever D, substantially as described and shown.

This specification signed and witnessed this 19th day of March, 1879.

J. S. ROYS.

Witnesses:
WM. R. STULTS,
A. M. BROWNSON.